United States Patent
Katayama

(10) Patent No.: US 8,699,900 B2
(45) Date of Patent: Apr. 15, 2014

(54) IMAGE PROCESSING APPARATUS AND DENSITY CORRECTION METHOD

(75) Inventor: Junichi Katayama, Shizuoka-ken (JP)

(73) Assignees: Kabushiki Kaisha Toshiba, Tokyo (JP); Toshiba Tec Kabushiki Kaisha, Tokyo (JP)

(*) Notice: Subject to any disclaimer, the term of this patent is extended or adjusted under 35 U.S.C. 154(b) by 427 days.

(21) Appl. No.: 13/079,626

(22) Filed: Apr. 4, 2011

(65) Prior Publication Data
US 2011/0243589 A1    Oct. 6, 2011

Related U.S. Application Data

(60) Provisional application No. 61/321,019, filed on Apr. 5, 2010.

(51) Int. Cl.
*G03G 15/00* (2006.01)
(52) U.S. Cl.
USPC .................................. 399/49; 399/60; 399/72
(58) Field of Classification Search
USPC ............................................... 399/49, 60, 72
See application file for complete search history.

(56) References Cited

U.S. PATENT DOCUMENTS 7,151,901 B2    12/2006    Hirai
2008/0166143 A1*    7/2008    Watanabe et al. ............... 399/27

FOREIGN PATENT DOCUMENTS

JP    2004-145143    5/2004
JP    2006-337699    12/2006

* cited by examiner

*Primary Examiner* — Ryan Walsh
(74) *Attorney, Agent, or Firm* — Patterson & Sheridan, L.L.P.

(57) ABSTRACT

An image processing apparatus includes an image forming unit, an image control unit, a sensor, and a correction unit. The image control unit controls the image forming unit to perform toner refresh which is an operation of outputting deteriorated toner at a high density, and controls the image forming unit to form a predetermined pattern. The sensor measures a density value of the formed image. The correction unit corrects the toner density for a high-density operation using the value measured from the image formed during the toner refresh and corrects the toner density for at least a low-density operation using the value measured from the predetermined pattern.

17 Claims, 8 Drawing Sheets

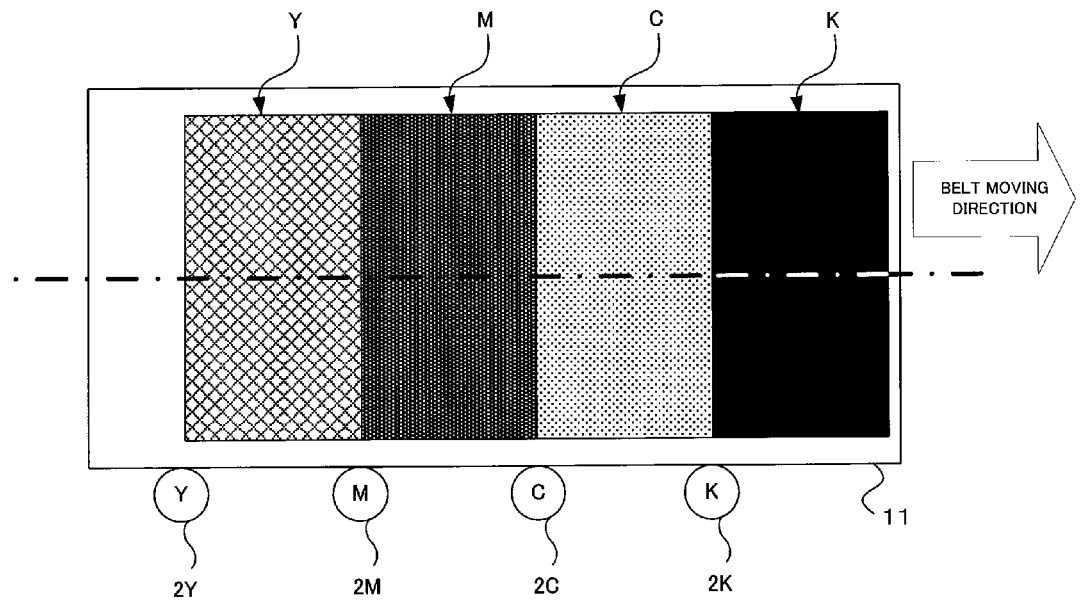
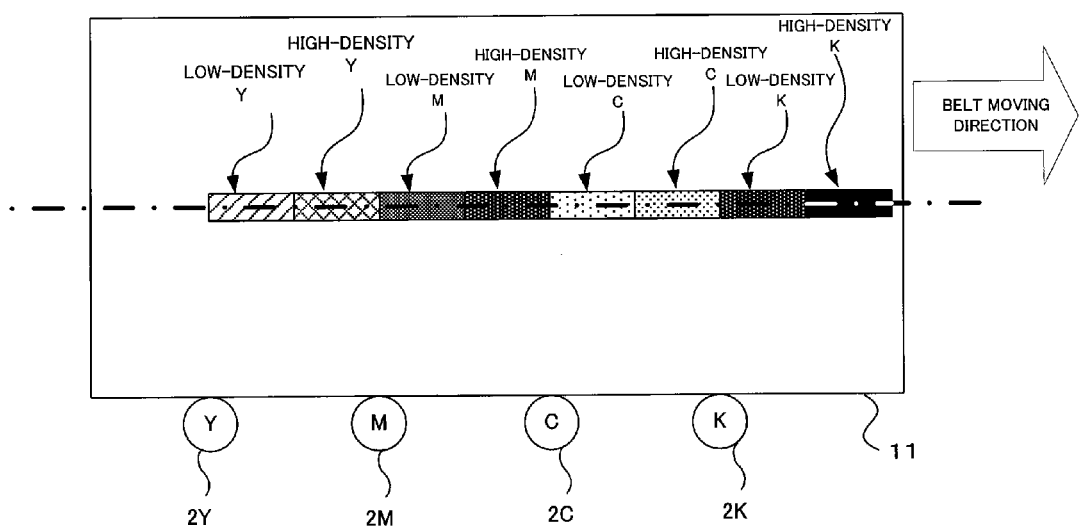

IMAGE PROCESSING APPARATUS AND DENSITY CORRECTION METHOD

CROSS-REFERENCE TO RELATED APPLICATION

This application is based upon and claims the benefit of priority from: U.S. provisional application 61/321,019, filed on Apr. 5, 2010; the entire contents all of which are incorporated herein by reference.

FIELD

Embodiments described herein relate generally to a technique for stabilizing an image in an image processing apparatus.

BACKGROUND

As a technique according to related art for stabilizing an image in an image processing apparatus, there is a technique for discharging toner which is deteriorated over time (toner refresh) and supplying new toner, thereby satisfactorily maintaining developing conditions. In this technique, the image processing apparatus forms a high-density band-like pattern of each color on the entire surface of a transfer belt in an image-formable range in a main-scanning direction, thereby discharging the deteriorated toner (hereinafter, this control is referred to as control A).

In addition, as another technique for stabilizing an image in an image processing apparatus, there is a technique for correcting toner density (the color density of a formed image). In this technique, the image processing apparatus forms particular high-density and low-density (halftone) patterns of each color on the transfer belt, reads the density of toner attached at this time using a sensor, and feeds back the result to a control unit for image formation, thereby correcting the toner density (hereinafter, this control is referred to as control B).

However, these controls take time, and since the print job of a user is not executed while these controls are performed, the user has to wait.

BRIEF DESCRIPTION OF THE DRAWINGS

FIG. 4A is a diagram showing a pattern used when control A is executed.

FIG. 4B is a diagram showing a pattern used when control B is executed.

DETAILED DESCRIPTION

An image processing apparatus includes an image forming unit, an image control unit, a sensor, and a correction unit. The image forming unit forms an image. The image control unit controls the image forming unit to perform toner refresh which is an operation of outputting deteriorated toner at a high density, and controls the image forming unit to form a predetermined pattern. The sensor measures a density value of the image formed by the image forming unit. The correction unit corrects the toner density for a high-density operation of the image forming unit using the measured value which is a value measured by the sensor from the image formed during the toner refresh, and corrects the toner density for at least a low-density operation of the image forming unit using the measured value which is a value measured by the sensor from the predetermined pattern.

When the control A and the control B described above have to be continuously executed, the image processing apparatus according to an embodiment first performs the control A, reads a band-like high-density pattern formed in the control A using the sensor that measures the toner density, and performs density correction for the high-density operation.

Accordingly, in the control B, a correction processing time for the high-density operation can be reduced, thereby reducing a waiting time for a user.

Hereinafter, this embodiment will be described with reference to the accompanying drawings.

Figure 1:
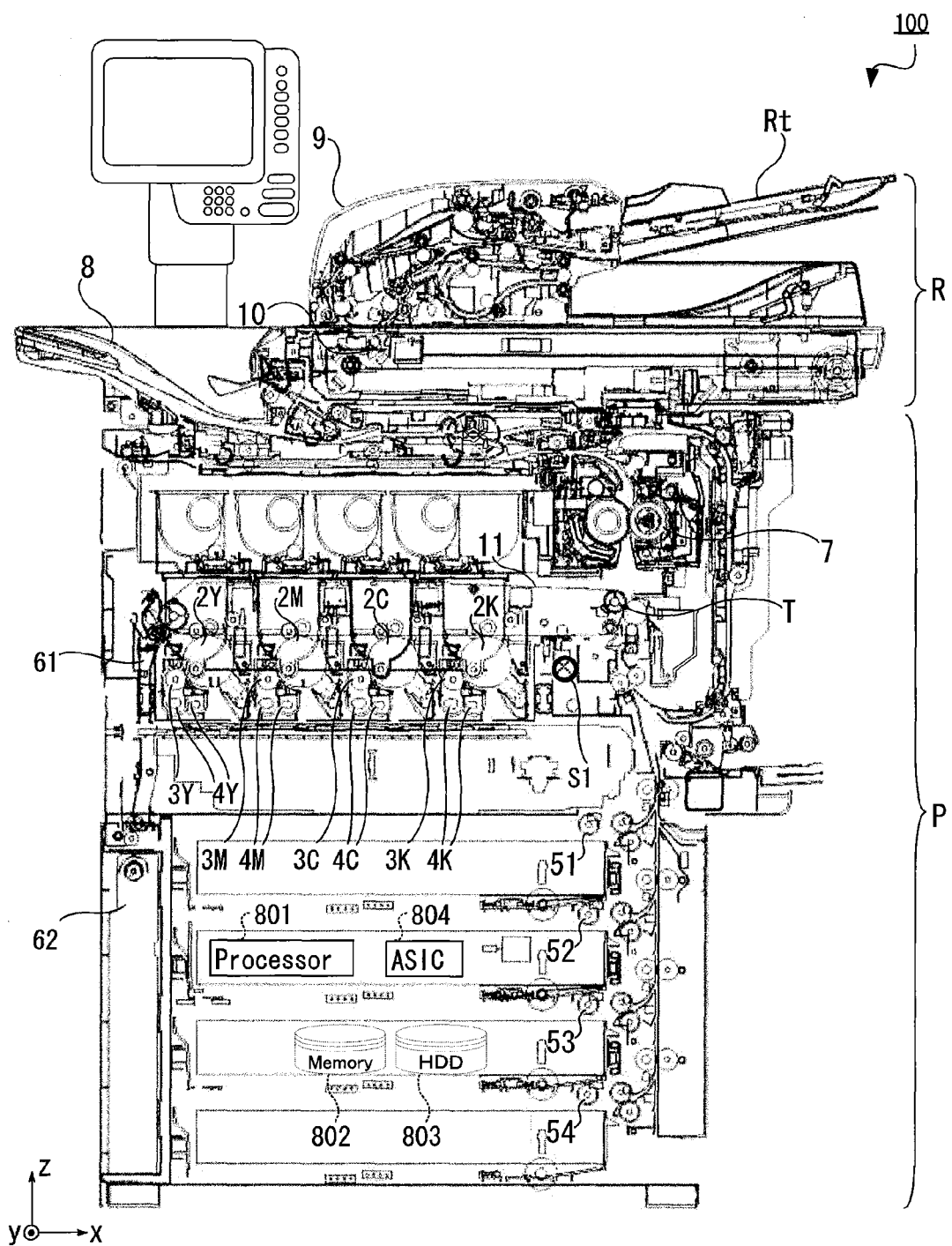
FIG. 1 is a cross-sectional view showing the configuration of an image processing apparatus.

FIG. 1 is a longitudinal cross-sectional view showing a simplified configuration of an image processing apparatus (MFP (Multi-Function Peripheral)) in this embodiment.

As shown in FIG. 1, the image processing apparatus 100 includes an image reading unit R and an image forming unit P.

The image reading unit R has a function of scanning and reading an image of a sheet original document or a book original document.

The image forming unit P has a function of forming a developer image on a sheet on the basis of the image read from the original document by the image reading unit R or image data transmitted to the image processing apparatus from an external device.

The image reading unit R includes an automatic document feeder (ADF) 9 which is able to automatically carry original documents to a predetermined image reading position, and reads an image of the original document which is automatically carried by the automatic document feeder 9 and placed on an original document tray Rt or an original document placed on a platen (not shown) using a scanning optical system 10.

In addition, the image forming unit P includes pickup rollers 51 to 54, photoconductors 2Y to 2K, developing rollers 3Y to 3K, mixers 4Y to 4K, an intermediate transfer belt 11, a fixing device 7, and a discharge tray 8.

In addition, the image processing apparatus 100 includes a processor 801 which is an operation processing device (for example, a CPU (Central Processing Unit)), a memory 802 which is a storage device, an HDD (Hard Disk Drive) 803, and an ASIC (Application Specific Integrated Circuit) 804. The processor 801 has a role of performing various processes in the image processing apparatus and also has a role of realizing various functions by executing programs stored in the memory 802. The memory 802 may be configured as, for example, a RAM (Random Access Memory), ROM (Read Only Memory), DRAM (Dynamic Random Access Memory), SRAM (Static Random Access Memory), VRAM (Video RAM), or the like, and has a role of storing various kinds of information and programs used in the image processing apparatus 100.

The HDD 803 stores data or programs that need to be stored to be non-volatile.

Figure 3:
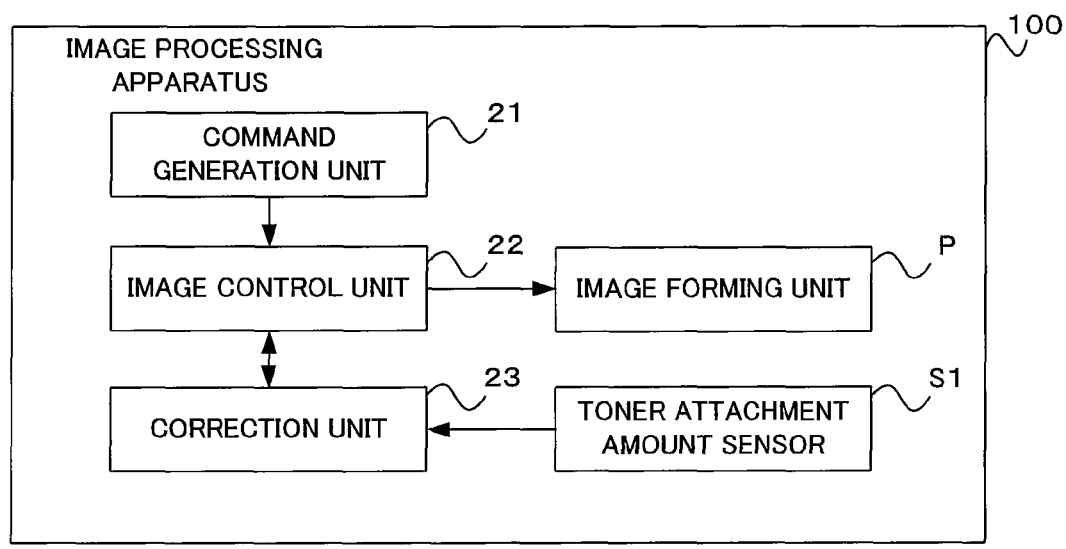
FIG. 3 is a block diagram of the image processing apparatus according to an embodiment.

The ASIC 804 is a unit for realizing each function shown in FIG. 3. In addition, the functions realized using the processor 801, the memory 802, and the HDD 803 may also be realized by the ASIC 804.

Hereinafter, as an example of a process of the image processing apparatus 100, the overview of a copying process will be described.

First, sheets picked up from cassettes by the pickup rollers 51 to 54 are supplied to a sheet carriage path. The sheets supplied to the sheet carriage path are carried in a predetermined carriage direction by a plurality of pairs of rollers.

In addition, images of a plurality of sheets of original documents that are automatically and sequentially carried by the automatic document feeder 9 are read by the scanning optical system 10 at the predetermined image reading position.

Next, on the basis of image data of the images read from the original documents by the image reading unit R, electrostatic latent images are formed on photoconductive surfaces of the photoconductors 2Y, 2M, 2C, and 2K for transferring developer images for yellow (Y), magenta (M), cyan (C), and black (B) on the sheets.

Subsequently, developers agitated by the mixers 4Y to 4K in developing devices are supplied to the photoconductors 2Y to 2K on which the electrostatic latent images are formed as described above by the developing rollers (so-called magnetic rollers) 3Y to 3K. Accordingly, the electrostatic latent images formed on the photoconductive surfaces of the photoconductors are developed.

The developer images formed on the photoconductors as such are transferred on a belt surface of the intermediate transfer belt 11 (so-called primary transfer), and the developer images carried by the rotation of the intermediate transfer belt 11 are transferred on the sheets carried at a predetermined secondary transfer position T.

The developer images transferred on the sheets are heated and fixed onto the sheets by the fixing device 7.

The sheets on which the developer images are heated and fixed are carried in the carriage path by the plurality of pairs of carrying rollers and are sequentially discharged on the discharge tray 8.

The image processing apparatus 100 outputs deteriorated toner to the intermediate transfer belt 11 regularly or according to conditions such as the number of printed copies, a length of time unused, and the like. In addition, the image processing apparatus 100 regularly outputs patterns for density measurement onto the intermediate transfer belt 11 and corrects the density of output toner. The toner output as such on the intermediate transfer belt 11 is peeled off the intermediate transfer belt 11 by a blade and discarded to a waste toner box 62 via a carriage path 61.

In addition, the image processing apparatus 100 includes a toner attachment amount sensor S1. The toner attachment amount sensor S1 is an optical sensor that measures the density of an image formed on the intermediate transfer belt 11 and illuminates a carriage surface of the intermediate transfer belt 11 to measure the color density of the formed image.

Figure 2:
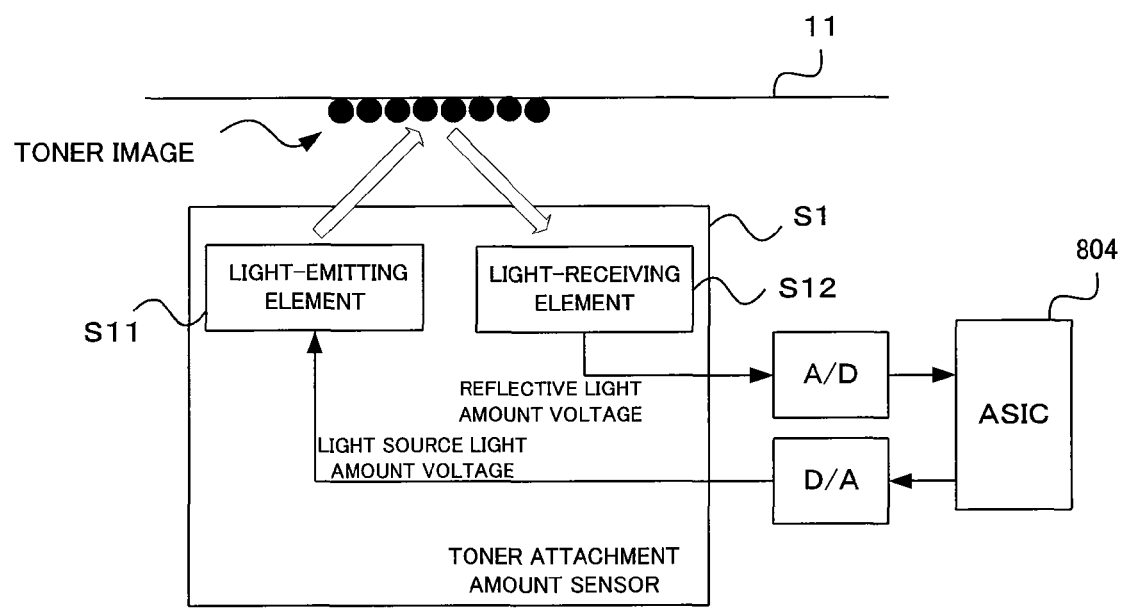
FIG. 2 is a diagram showing the configuration of a toner attachment amount sensor.

In FIG. 2, a configuration example of the toner attachment amount sensor S1 is shown. The toner attachment amount sensor S1 includes a light-emitting element S11 and a light-receiving element S12. The light-emitting element S11 emits light at a light source light amount voltage output from the ASIC 804 to illuminate the pattern on the intermediate transfer belt 11. The light-receiving element S12 receives light reflected from the toner image and outputs an electric signal (reflective light amount voltage) to the ASIC 804. A/D conversion and D/A conversion are performed between the ASIC 804 and the toner attachment amount sensor S1.

Next, an example of a function block of the image processing apparatus 100 is shown in FIG. 3. The image processing apparatus 100 includes, in addition to the image forming unit P and the toner attachment amount sensor S1 described above, a command generation unit 21, an image control unit 22, and a correction unit 23. In the description of this embodiment, each of the units is realized by the ASIC 804. However, they may also be realized by the processor 801 by loading programs stored in advance in the HDD 803 on the memory 802 and then by operating and executing the loaded programs.

The command generation unit 21 instructs the image processing apparatus 100 to execute processes regularly or when a predetermined condition is satisfied. In this embodiment, particularly, the command generation unit 21 performs an execution command for control A or an execution command for the control B.

The image control unit 22 acquires an image from a print job at the execution command from the command generation unit 21 or acquires a pattern image defined in advance and controls the image forming unit P to form the acquired image. In this embodiment, the image control unit 22 acquires patterns for the control A or the control B for the image forming unit P and controls the image forming unit P so as to transfer (form) the patterns on the intermediate transfer belt 11.

The toner attachment amount sensor S1 illuminates the pattern for the control A (hereinafter, a pattern A) and the pattern for the control B (hereinafter, a pattern B) formed on the intermediate transfer belt 11 and measures the density value of the patterns.

The correction unit 23 performs a high-density correction process using the density value measured from the pattern A by the toner attachment amount sensor S1. The correction unit 23 performs the high-density and low-density correction process using the density value measured from the pattern B by the toner attachment amount sensor S1. In addition, the high density (the low density) refers to a density at which the value measured by the toner attachment amount sensor S1 reaches a target value for high density (a target value for low density) as designed. In addition, the correction of the density refers to the correction of a density in a range including the target value.

Next, the pattern A formed under the control of the image control unit 22 is shown in FIG. 4A. The image control unit 22 controls the image forming unit P to form the pattern shown in FIG. 4A on the intermediate transfer belt 11 under the command of the command generation unit 21. The image control unit 22 controls an image of each of Y, M, C, and K to be formed on the entire surface in a formable range in the main scanning direction at a high density. By forming the pattern of FIG. 4A a plurality of times, deteriorated toner is discharged.

In addition, the pattern B is shown in FIG. 4B. The image control unit 22 controls the image forming unit P to form high-density and low-density images of each of Y, M, C, and K at the center in the main scanning direction on the intermediate transfer belt 11. In addition, dot-dashed lines of FIGS. 4A and 4B are illumination lines of the toner attachment amount sensor S1.

Figure 5:
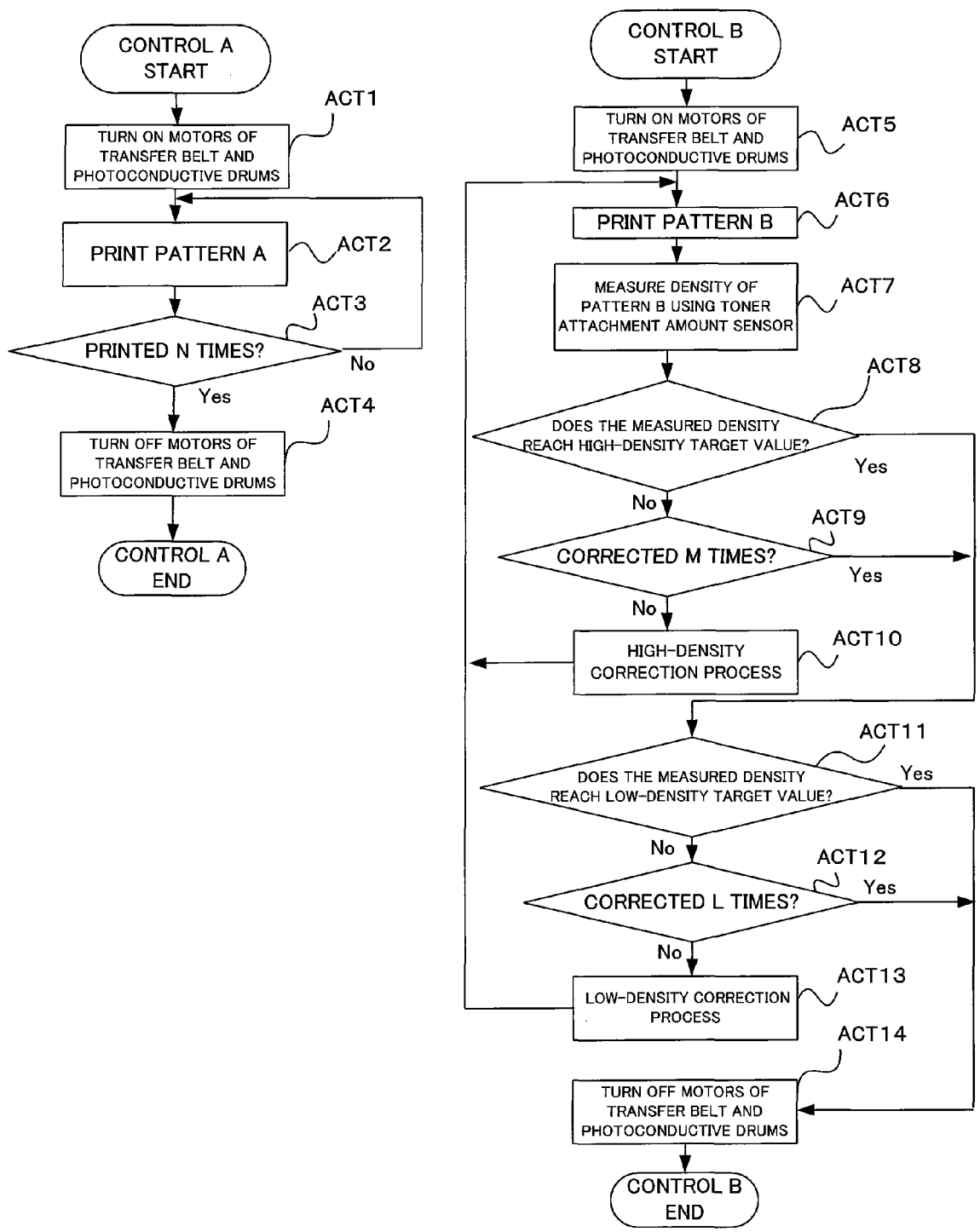
FIG. 5 is a flowchart showing an example of operations in which the control A and the control B are individually performed by the image processing apparatus.

Next, operations of the image processing apparatus 100 to perform the control A and the control B will be described. FIG. 5 shows an example of the control A and the control B executed independently (asynchronously) as in the related art.

The control A will be described. First, the intermediate transfer belt 11 and the photoconductors 2Y to 2K are driven (ACT 1). Under the execution command of the command generation unit 21, the image control unit 22 controls the image forming unit P to form the pattern A (see FIG. 4A), and the image forming unit P forms the pattern A on the intermediate transfer belt 11 (ACT 2). This operation is repeated N times (ACT 3, loops to ACT 2 when No). When the operation is performed N times (ACT 3, Yes), the driving of the intermediate transfer belt 11 and the photoconductors 2Y to 2K are stopped (ACT 4), and the process is ended.

The command generation unit 21 outputs an execution command to the image control unit 22 so that, for example, the process of ACT 1 to ACT 4 is executed regularly.

Next, the control B will be described. The intermediate transfer belt 11 and the photoconductors 2Y to 2K are driven (ACT 5), the image control unit 22 controls the image forming unit P to form the pattern B (see FIG. 4B) under the command from the command generation unit 21, and the image forming unit P forms the pattern B on the intermediate transfer belt 11 (ACT 6).

The toner attachment amount sensor S1 measures the density value (the low-density value and the high-density value of each color) from the pattern B (ACT 7).

The correction unit 23 acquires a target value of each color stored in advance in a storage region of the ASIC 804 and determines for each color whether or not the density value for the high-density operation reaches the target value (ACT 8). If all of the colors reach the target values (ACT 8, Yes), the process proceeds to ACT 11, and if there is a color that does not reach the target value (ACT 8, No), the correction unit 23 determines whether or not the high-density correction process is executed M times (ACT 9).

If the high-density correction process is performed M times (ACT 9, Yes), the process proceeds to ACT 11, and if the correction process is not performed M times (ACT 9, No), the correction unit 23 performs the high-density correction process (ACT 10). Then, the process returns to ACT 6. For the correction process, a technique according to the related art is used.

Next, the correction unit 23 performs a process on the low-density value measured by the toner attachment amount sensor S1. When there is a color low-density value of which does not reach the target value (ACT 11, No), the correction unit 23 determines whether or not the low-density correction process is performed L times (ACT 12). When the correction process is not performed L times (ACT 12, No), the correction unit 23 performs the low-density correction process (ACT 13), and the process returns to ACT 6. On the other hand, when the low-density values of all of the colors reach the target values (ACT 11, Yes), or when the low-density correction process is performed L times (ACT 12, Yes), the driving of the intermediate transfer belt 11 and the photoconductors 2Y to 2K is stopped (ACT 14), and the process is ended.

Figure 6:
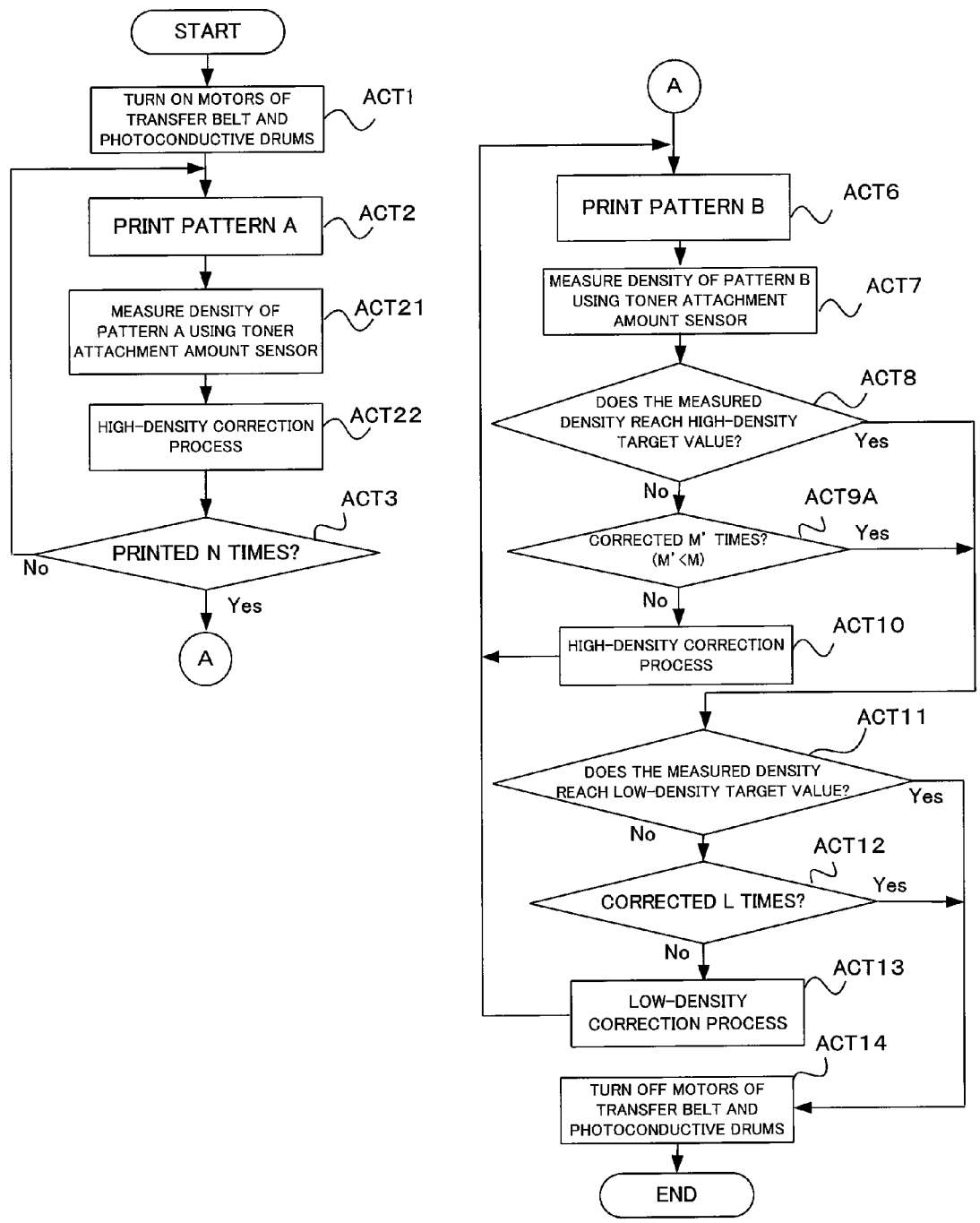
FIG. 6 is a flowchart showing an example of operations of the image processing apparatus according to the embodiment.

Next, operations of the image processing apparatus 100 when the control A and the control B are performed at the same time are shown in FIG. 6. As shown by the example of FIG. 5, in the example according to the related art in which the control A and the control B are independently performed, although a high-density pattern is included in the pattern A as in the pattern B, the high-density pattern is not applied. The image processing apparatus 100 utilizes the pattern A output in the control A for a density correction process when the control A and the control B are performed at the same time.

When time periods for performing the control A and the control B overlap, the image processing apparatus 100 performs the control A first, and performs the control B thereafter. Control of the performing order is performed by the command generation unit 21 or the image control unit 22. In addition, since reference numerals the same as those of FIG. 5 denote processes the same as those described above, detailed description thereof will be omitted.

After the pattern A is formed in the control A (ACT 2), the toner attachment amount sensor S1 performs density measurement on the pattern A (ACT 21), and the correction unit 23 performs the high-density correction process (ACT 22). The process performed here is the same process as that of ACT 10.

When the process for the pattern A is performed N times (ACT 3, Yes), the process proceeds to the control B. In the control B, after ACTs 6 to 8 are performed, the correction unit 23 determines whether or not the high-density correction process is performed M' times (ACT 9A). Since the process for the high-density correction is performed in the control A, M' is a number smaller than M described above (M'<M). Operations performed thereafter are the same as those of FIG. 5.

When the control A and the control B are performed at the same time as described above, high-density correction is performed by the correction unit 23 during the control A. Therefore, during the control B, since the high-density process is performed a smaller number of times, the process can be ended within a short time while ensuring precision of the density correction. In addition, the number of formations of the pattern B is reduced, so that an amount of toner consumed is suppressed.

Figure 7A:
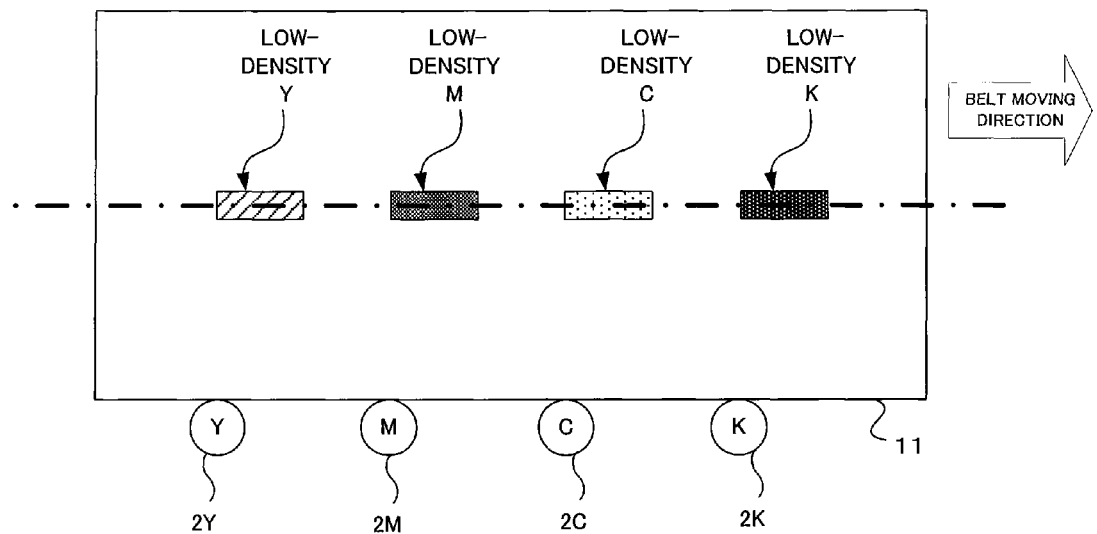
FIG. 7A is a diagram showing an example in which only a low-density pattern is formed in the control B.

Another example of the operations described with reference to FIG. 6 will be described. As in the example of the operations of FIG. 6, when the high-density correction process is already performed in the control A (ACT 22), there may be a case where the high-density correction process becomes a redundant process in the process B. Therefore, when the control A and the control B are performed at the same time, a configuration in which the high-density correction process is not performed in the control B may be considered. FIG. 7A is a diagram showing an image formation pattern formed in the control B in this case. Since printing at a high density is unnecessary, consumption of the corresponding amount of toner can be suppressed, and the process including the correction process is ended within a short time (the process is ended while at least ACTs 8 to 10 of FIG. 6 are not performed).

Figure 7B:
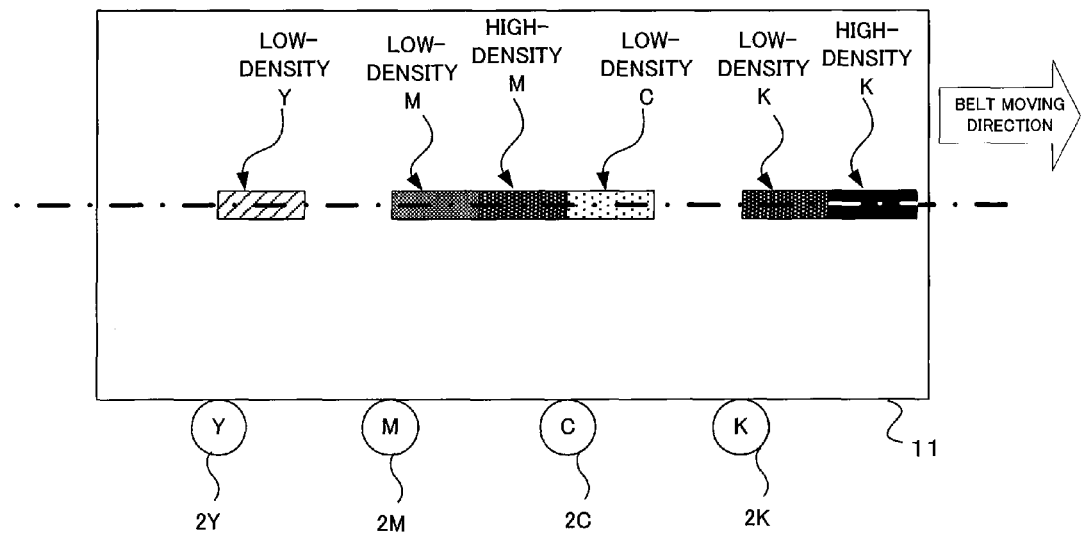
FIG. 7B is a diagram showing an example in which the pattern that reaches high-density target values in the control A is not formed in a pattern of the control B.

As still another example, a configuration in which only a color that does not reach the target value in the control A may be subjected to the high-density correction process in the control B may be considered. FIG. 7B is a diagram showing an image formation pattern in the control B in this case. In the example of FIGS. 7B, C and Y show good results in the control A and K and M need re-correction in the control B.

Figure 8:
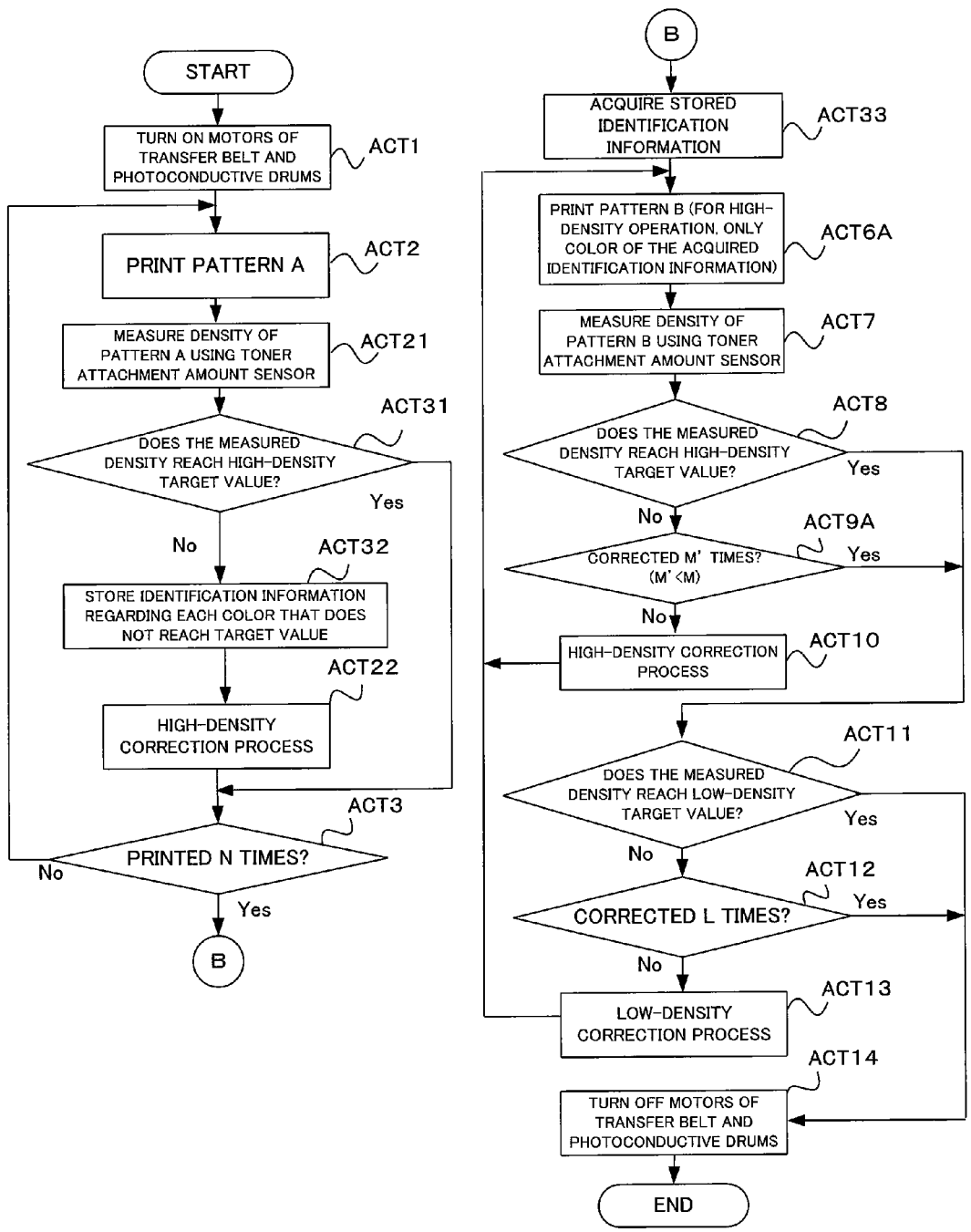
FIG. 8 is a flowchart showing an example in which determination of whether or not a measured value reaches a high-density target value in the control A is performed.

FIG. 8 shows an operation example of the image processing apparatus 100 when only colors that do not reach the target values in the control A are subjected to the high-density correction process in the control B. In addition, since reference numerals the same as those of FIG. 6 denote processes the same as those described above, detailed description will be omitted. After the density measurement of the pattern A is performed (ACT 21), the correction unit 23 determines whether or not the measured value reaches the target value (ACT 31). When the measured value does not reach the target value (ACT 31, No), the correction unit 23 stores identification information regarding the colors that do not reach the target values in a storage region of the ASIC 804 (ACT 32) and performs the high-density correction process (ACT 22). On the other hand, when the measured value reaches the target value (ACT 31, Yes), the process proceeds to ACT 3.

In addition, in the control B, the image control unit 22 and the correction unit 23 acquire the stored identification information (ACT 33). The image control unit 22 controls the image forming unit P in order to output only the color corresponding to the identification information during high-density toner output (ACT 6A). The subsequent process is the same as that of FIG. 6, and the correction unit 23 corrects only the color corresponding to the identification information for the high-density operation.

In addition, in each of the examples described above, the high-density correction process is performed each time (N times). However, there may be a case where a large amount of deteriorated toner is contained at an initial stage of the control A and thus is not suitable for the density correction process. Therefore, a configuration in which the density correction process is performed at a stage in the latter half, or a configuration in which the density correction process is performed at the final stage may also be considered.

In addition, when the control A is a control in which deteriorated toner of all of Y, M, C, and K is not discharged and deteriorated toner of a reduced number of the colors is discharged, a configuration in which the reduced number of the colors is subjected to the high-density correction process in the control A, and in the control B, the number of high-density correction processes performed on the colors subjected to the high-density correction process in the control A is reduced (or is not performed) may also be considered.

In addition, in the examples described above, the high-density correction process is performed in the control A only when the control A and the control B are performed at the same time. However, the embodiments are not limited thereto.

As described above in detail, in the technique described through the specification, since the high-density correction process is performed during discharge of deteriorated toner, an execution time for control can be reduced, thereby reducing a waiting time for the user.

While certain embodiments have been described, these embodiments have been presented by way of example only, and are not intended to limit the scope of invention. Indeed, the novel apparatus and methods described herein may be embodied in a variety of other forms; furthermore, various omissions, substitutions and changes in the form of the apparatus and methods described herein may be made without departing from the sprit of the inventions. The accompanying claims and their equivalents are intended to cover such forms or modifications as would fall within the scope and spirit of the inventions.

What is claimed is:

1. An image processing apparatus comprising:
   an image forming unit configured to form an image;
   an image control unit configured to control the image forming unit to perform a toner refresh operation that includes outputting deteriorated toner to form a first predetermined pattern having a predetermined density, and to control the image forming unit to form a second predetermined pattern;
   a sensor configured to measure a density value for each of the first and second predetermined patterns formed by the image forming unit; and
   a correction unit configured to correct a first toner density setting for a high-density operation of the image forming unit based on the measured density value of the first predetermined pattern formed during the toner refresh operation, and configured to correct a second toner density setting for at least a low-density operation of the image forming unit based on the measured density value of the second predetermined pattern, the low density operation requiring a lower toner density compared to the high density operation;
   the image control unit controlling the image forming unit to again form the second predetermined pattern after the first toner setting has been corrected by the correction unit, when the control of the toner refresh operation and the control of the formation of the second predetermined pattern are performed at the same time.

2. The apparatus according to claim 1,
   wherein the image control unit controls the image forming unit to form the second predetermined pattern with a reduced number of colors from among colors that are used during the toner refresh operation, and
   the correction unit corrects the first toner density setting for the reduced number of colors in based on the measured density value of the first predetermined pattern, and corrects the first toner density setting for the other colors that are used during the toner refresh operation based on the measured density value of the second predetermined pattern.

3. The apparatus according to claim 1, wherein the correction unit further determines whether the first toner density setting is appropriate when correcting the first toner density setting during the toner refresh operation, and when there is a color having a first toner density setting that is determined to not be appropriate, and corrects the first toner density setting for the color determined to have a first toner density setting that is determined to not be appropriate, based on measured density value of the second predetermined pattern.

4. The apparatus according to claim 3, wherein the image control unit controls the image forming unit to form high-density and low-density patterns as the second predetermined pattern, and controls the image forming unit to form the high-density pattern using only colors that have a first toner density setting determined to not be appropriate.

5. The apparatus according to claim 1, wherein the image forming unit forms the first predetermined pattern with deteriorated toner of each color, using the first toner density setting.

6. The apparatus according to claim 5, wherein the correction unit corrects the first toner density setting for each of the plurality of times that the first predetermined pattern is formed.

7. The apparatus according to claim 5, wherein the correction unit corrects the first toner density setting after at least the last time of the plurality of times that the first predetermined pattern is formed.

8. The apparatus according to claim 1,
   wherein the image control unit controls the image forming unit to form high-density and low-density patterns for each color as the second predetermined pattern, and controls the image forming unit to form the second predetermined pattern a plurality of times, and the correction unit corrects the first toner density setting and the second toner density setting, based on the measured density value of the second predetermined pattern a plurality of times.

9. The apparatus according to claim 8, wherein, when the control of the toner refresh operation and the control of the formation of the second predetermined pattern are performed at the same time, the correction unit corrects the first toner density setting a number of times smaller than a number of times that the setting unit corrects the first toner density setting when the control of the toner refresh operation and the control of the formation of the second predetermined pattern are performed independently.

10. A density correction method used in an image processing apparatus including an image forming unit that forms an image, the method comprising:
controlling the image forming unit to perform a toner refresh operation that includes outputting deteriorated toner to form a first predetermined pattern having a predetermined density;
measuring a density value of the first predetermined pattern and correcting a first toner density setting for a high-density operation of the image forming unit based on the measured density value of the first predetermined pattern;
controlling the image forming unit to form a second predetermined pattern; and
measuring a density value of the second predetermined pattern and correcting a second toner density setting for at least a low-density operation of the image forming unit the measured value based on the measured density value of the second predetermined pattern, the low density operation requiring a lower toner density compared to the high density operation;
the image forming unit being controlled to form the second predetermined pattern with a reduced number of colors from among colors that are used during the toner refresh operation, and
the first toner density setting being corrected, for the reduced number of colors, based on the measured density value of the first predetermined pattern, and for the other colors that are used during the toner refresh operation, based on the measured density value of the second predetermined pattern.

11. The method according to claim 10, further comprising:
determining whether the first toner density setting is appropriate when correcting the toner density during the toner refresh operation,
wherein, when there is a color having a first toner density setting that is determined to not be appropriate, the first toner density setting for the color having a first toner density setting determined to not be appropriate is corrected based on the measured density value of the second predetermined pattern.

12. The method according to claim 11, wherein the image forming unit forms high-density and low-density patterns as the second predetermined pattern, and the image forming unit forms the high-density pattern using only colors that have a first toner density setting determined to not be appropriate.

13. The method according to claim 10, wherein the image forming unit forms the first predetermined pattern with deteriorated toner of each color, using the first toner density setting, a plurality of times during the toner refresh operation.

14. The method according to claim 13, wherein the correction unit corrects the first toner density setting for each of the plurality of times that the first predetermined pattern is formed.

15. The method according to claim 13, wherein the correction unit corrects the first toner density setting after at least the last time of the plurality of times that the first predetermined pattern is formed.

16. The method according to claim 10, wherein the image forming unit forms high-density and low-density patterns for each color as the second predetermined pattern, and controls the image forming unit to form the second predetermined pattern a plurality of times, and
the image processing apparatus corrects the first toner density setting and the second toner density setting based on the measured density value of the second predetermined pattern a plurality of times.

17. The method according to claim 16, wherein, if controlling the image forming unit to perform the toner refresh operation and controlling the image forming unit to form the second predetermined pattern are performed at the same time, the first toner density setting is corrected a number of times smaller than a number of times that the first toner density setting is corrected if controlling the image forming unit to perform the toner refresh operation and controlling the image forming unit to form the second predetermined pattern are performed independently.

* * * * *